Aug. 25, 1942.    J. H. VAN UUM    2,294,255
CLIP INSTALLING DEVICE
Filed June 1, 1939    2 Sheets-Sheet 1

INVENTOR.
John H. Van Uum,
BY
John H. Leonard,
his ATTORNEY.

Aug. 25, 1942.  J. H. VAN UUM  2,294,255
CLIP INSTALLING DEVICE
Filed June 1, 1939  2 Sheets-Sheet 2

INVENTOR.
John H. Van Uum,
BY John H. ————,
his ATTORNEY.

Patented Aug. 25, 1942

2,294,255

UNITED STATES PATENT OFFICE 2,294,255

CLIP INSTALLING DEVICE

John H. Van Uum, Lakewood, Ohio

Application June 1, 1939, Serial No. 276,931

8 Claims. (Cl. 29—84)

This invention relates to an apparatus for effecting concurrent installation of a plurality of securing clip elements with respect to a member to be secured thereby and particularly for concurrently installing securing clip heads in a trim strip such as automobile bead trim which is to be connected to an apertured supporting panel by the clips.

In assembling securing elements, such as spring clips, in hollow trim members and the like, the customary practice has been to individually insert the clips into one end of the strip and then manually space them apart a distance as nearly as possible equal to the distance between the apertures in the supporting panel or member to which they are to be applied, and then to connect the assembly to the supporting panel by individually finally adjusting each clip longitudinally of the trim to accurately align it with its respective aperture and then inserting it therein.

Due to the fact that the clips had to be moved longitudinally of the trim, the head portions were not securely positioned in the trim, and as a result, the individual clips shifted out of alignment with their respective apertures in the support before and during assembly. Also, as a result, the trim member was not as securely fastened to the supporting member as desired after assembly. Even if the clips were accurately positioned before installation in the trim member, they were apt to shift during handling before final installation.

It is therefore an object of the present invention to provide an apparatus for quickly and firmly simultaneously installing a plurality of spring clips an accurate predetermined distance apart in the trim member.

Another object of this invention is to provide an apparatus capable of producing the above results, in which a plurality of spring clips can be quickly and accurately supported a predetermined distance apart, corresponding accurately to the distance between the apertures in the supporting members, and the head portions thereof then contracted to allow the trim member to be positioned thereover simultaneously, and then allowed to expand toward their original condition so that the head portions firmly contact the inner walls of the trim member and remain securely in place therein.

Another specific object of this invention is to provide an apparatus for producing the above desired results and which is operated from a common source convenient to the operator and which has a mechanism actuated by the common source to hold the head portions in contracted condition simultaneously.

Another object of this invention is to provide an apparatus for simultaneously installing a plurality of spring securing clips in which the head portions are firmly secured in place from lateral displacement within the trim member and in which the tension of the head portions is further increased during installation of the trim on the support so as to retain the clips a predetermined distance apart and in proper position in a direction normal to the trim.

Another object of this invention is to provide an apparatus of this nature which can be cheaply constructed and which is simple in operation.

Other objects and advantages will become apparent from the following specification, wherein reference is made to the drawings, in which.

Figure 1:
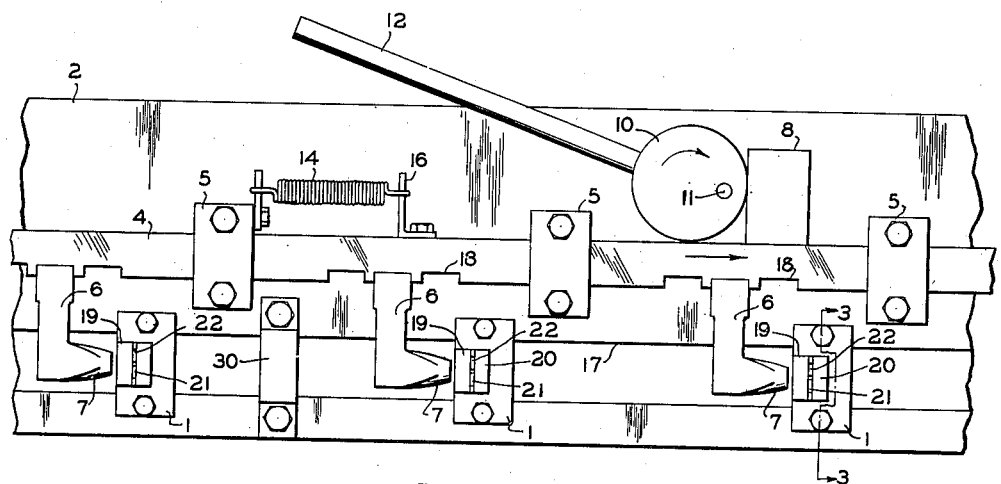
Fig. 1 is a top plan view of a perferred embodiment of the device for contracting the head portions of the securing elements.

Referring to the form of apparatus shown in Figs. 1 to 6 inclusive, the device comprises a plurality of clip stations or clip supporting elements 1 which are secured to a supporting frame 2 a predetermined distance apart, accurately corresponding to the distance between the apertures of the supporting panel to which the bead trim member is to be secured. Slidably mounted on the supporting frame 2 is a slide bar 4 which is held in position for sliding by suitably spaced bearing blocks 5 on the frame 2. The slide bar 4 has arms 6 mounted thereon for adjustment longitudinally of the bar. The arms 6 preferably correspond in number to and are associated respectively with the supporting elements 1. Each arm 6 has a cam element 7 adjacent its associated clip supporting element 1.

Suitably mounted on the slide bar 4 is a cam block 8 which is acted upon by the actuating cam element 10 which may be in the form of an eccentric which is mounted on a pivot 11 and carries an operating handle 12.

It will be noted that the cam elements 7 are secured to the common slide bar 4 and therefore are actuated or moved lineally thereby from the common source of the handle 12 which is under convenient control of an operator. A return spring 14, one end of which is secured to one of the bearing blocks 5, and the other end of which is secured to an angle 16 which is mounted on the slide bar 4, returns the slide bar to its starting position when the handle 12 is released.

Figure 3:
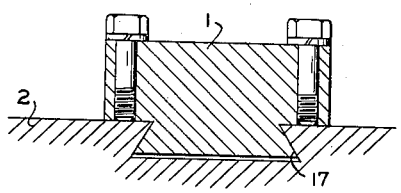
Fig. 3 is a cross sectional view through a clip supporting member of the device and is taken along the line 3—3 of Fig. 1.
Figure 4:
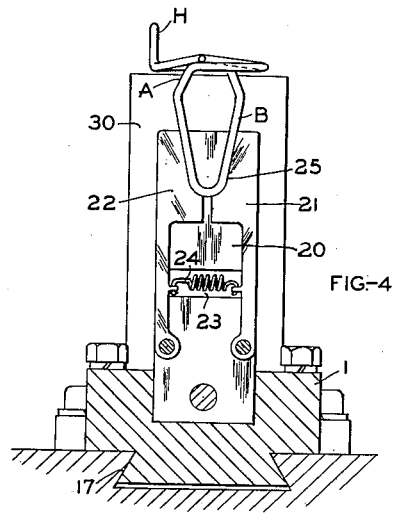
Fig. 4 is a longitudinal sectional view of the clip supporting member, showing a clip in place, and is taken along the line 4—4 of Fig. 2.
Figure 5:
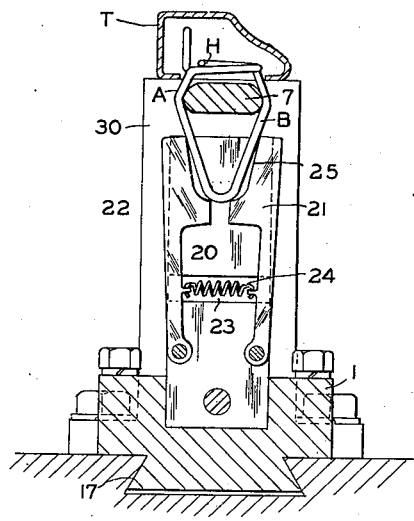
Fig. 5 is a sectional view similar to Fig. 4 and showing the cam element in position expanding the shank of the clip and a trim member placed thereover.

In order to provide for an adjustment of the clip supporting elements 1 to compensate for a variation in distance between the apertures in the supporting panel, the frame 2 is provided with a longitudinal slot or guideway 17 into which a portion of each clip supporting element 1 is dovetailed, as illustrated particularly in Figs. 3, 4 and 5, and in which the elements 1 are slidable for adjustment and are held in the adjusted position by means of bolts, as illustrated.

The arms 6, carrying cam members or surfaces 7, are secured in recesses 18 in the slide bar 4 in order to provide a bearing surface between the arm and the slide bar to prevent lateral shifting of the arms and cam elements.

Figure 2:
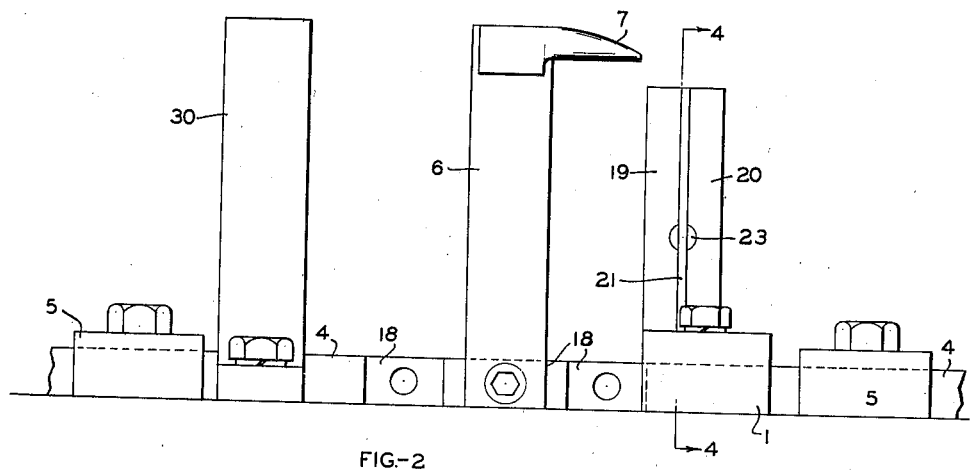
Fig. 2 is an end elevation of the device illustrated in Fig. 1.

To provide for an adjustment of the slide bar 4 to compensate for the variation in distance between the apertures in the supporting member, the slide bar 4 is provided with a plurality of the recesses 18, as illustrated in Figs. 1 and 2. The recesses 18 may be tapered to accommodate a set screw to properly secure the arms 6 to the slide bar 4.

Referring to Figs. 4 and 5, there is illustrated an apparatus for supporting the clip in position in the clip supporting elements 1. To conveniently install the securing clips in the trim member, it is necessary that the clips be properly positioned with their head portions in proper alignment to the longitudinal direction of the trim so that the trim member may be conveniently placed thereover. The clip supporting elements 1 are provided with upright members 19 and 20, between which are positioned gripping jaws or members 21 and 22. The jaws 21 and 22 are pivotally mounted between the upright members 19 and 20. The upright members 19 and 20 are recessed, as at 23, to accommodate a spring 24, one end of which is connected to the jaw 21 and the other end of which is connected to the jaw 22. When the shank portion B of a securing clip, such as indicated at A in Fig. 4, is placed into the clip supporting member, it is held in an upright position due to the fact that the fingers 21 and 22 are provided with shank engaging surfaces 25 and are held under constant tension to force the clip into an upright position, as illustrated in Fig. 4. The jaws 21 and 22, being pivotally mounted between the upright arms 19 and 20, allow them to be urged resiliently apart upon expansion of the shank portion B of the clip element when the shank portion is expanded by the cam elements 7 to cause contraction of the head, as illustrated in Fig. 5.

In operation, the operator first adjusts the apparatus to position the clip supporting elements 1 the proper distance to conform to the distance between the distance between the apertures in the support into which the clips are to be inserted for connecting the trim elements. He then stations the spring clips with their shank portions in the respective supporting elements 1. He then compresses the head portion H of the spring clip A by actuating the operating handle 12, which causes the slide bar 4 to be moved to the right in Fig. 4, effecting engagement of the cam surfaces 7 with the shank portion of the clip A and causing the shank B to expand as illustrated in Fig. 5. This expansion causes contraction of the head portions H to a dimension less than the dimension of the opening in the trim member. The operator then places the bead trim member over the contracted head portions of all of the clips A concurrently. The trim member T is held in its proper position by guide blocks 30 which are conveniently mounted on the supporting frame 2. After the trim member is so positioned, the operator releases the cam 10 by means of the handle 12, and the slide bar 4 is moved out of operating position to the position illustrated in Fig. 1 by means of the return spring 14. This operation causes the shank portions B of all of the clips A to contract and the head portions H to expand and firmly engage within the trim member T.

Figure 6:
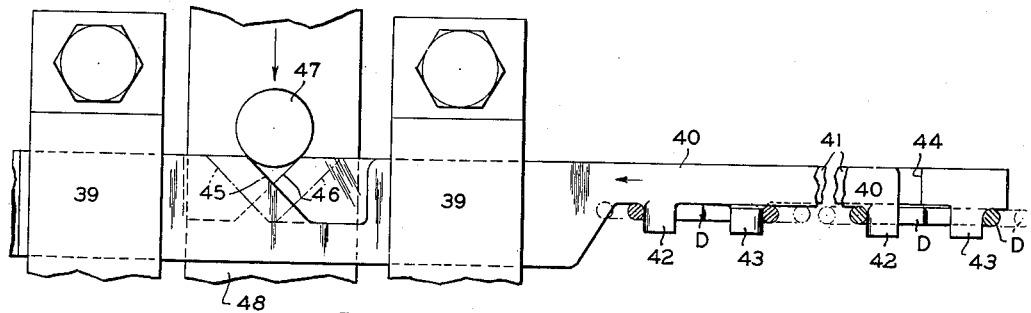
Fig. 6 is a somewhat diagrammatic top plan view of a modified form of apparatus for contracting the head portions of a spring clip.
Figure 7:
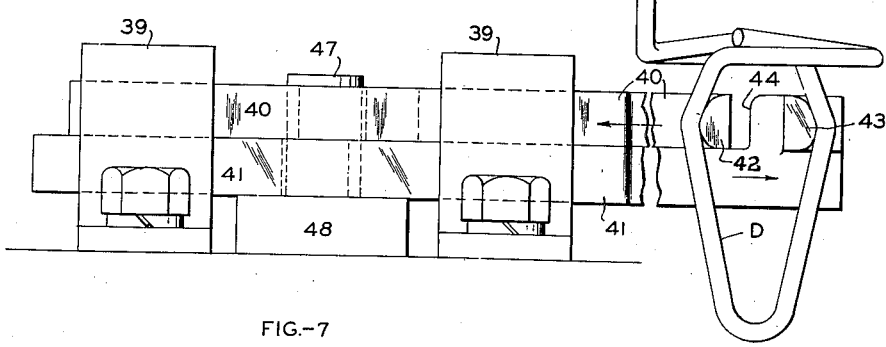
Fig. 7 is a front elevation of the apparatus illustrated in Fig. 6 showing a spring clip in position prior to the contraction of the head portion.

Referring to the modification of my apparatus illustrated somewhat diagrammatically in Figs. 6 and 7, the modified device also includes a plurality of stations to condition clips to allow the bead trim to be positioned over the head portions of the clips during the assembly operation. The device comprises a pair of slide bars 40 and 41 which are slidably mounted, one over the other, on a suitable supporting member by means of bearing blocks 39 and are provided with shank engaging jaws 42 and 43, respectively. The bottom slide bar is provided with an offset portion 44 to position the shank engaging jaws 43 in line with and opposite to the shank engaging jaws 42 of the arm 40 in order that the forces applied to the shank portion are in the same lateral plane and that a tilting of the clip is prevented during the operation of the device.

As illustrated in Fig. 6, the slide bars 40 and 41 have oppositely disposed cam surfaces 45 and 46, respectively, which are acted upon by the cam actuating pin 47 on a cross bar 48 which may be mounted on the frame by means of bearing blocks (not shown). The shank portion of the clip D is placed into engagement with the jaws 42 and 43 and holds the clip with the head portion of the clip extending above the slide bar 40 and accessible to the trim member to be installed.

The cross bar 48 is then operated by any suitable means to cause it to be moved toward the slide bars 40 and 41 and is operable in a direction normal to the direction of operation of the slide bars. As the cross bar 48 is moved in the direction toward the slide bars 40 and 41, as illustrated by the arrow in Fig. 6, the actuating pin 47, acting upon the cam surface 45, causes the slide bar 40 to be moved to the left of the position illustrated, and causes the slide bar 41, due to the slope of the cam surface 46, to be moved to the right of the position illustrated. These operations cause the shank portions of the clips to be expanded and the head portions to be contracted.

The head portions of the clips are held in this contracted condition while a trim member is placed over all of them concurrently and then the cross bar 48 is moved to release the jaws 42 and 43 by resilient means (not shown). Release of the shank permits the head portion of the spring securing clip D to expand and firmly engage the trim member. Any number of clip supporting stations may be provided having a common actuating means operated from a common source, in order that a plurality of clips may be simultaneously conditioned for firm and accurate positioning in the trim member.

It will become apparent from the foregoing that, while the apparatus or device illustrated operates in a manner for effecting installation of a clip of a specific design and one having crossed leg portions in which expansion of the shank causes contraction of the head, it can be designed, with slight modifications, to produce the desired results upon a clip in which contraction of the shank causes contraction of the head, without departing from the scope of the appended claims.

I claim:

1. An apparatus for installing a securing clip which has an expansible and contractible head portion in a member which has an opening of less width than the width of the head portion when the head portion is in its normally expanded condition and wherein the head portion is insertable through the opening when the head portion is in contracted condition and is moved relatively toward the opening, said apparatus comprising a supporting frame, a clip supporting element mounted thereon and operative for supporting a clip in a position wherein the head portion of the clip is exposed for access to the opening in said member, said clip supporting element comprising a plurality of jaws which are movable relatively toward and away from each other, means resiliently urging the jaws into a position for engaging and yieldably holding a clip in said position, movable means carried by the support and movable into and out of a predetermined position, a cam element operatively connected to said movable means and operated thereby when the movable means is moved to said predetermined position, preparatory to insertion of the head portion of the clip in the opening and while the clip is supported in said position by said element and during entrance of the head portion into and passage thereof through the opening in said member, to engage the clip and operate the clip to contract the exposed head portion and maintain the head portion in contracted condition, so long as the movable means remain in its said predetermined position, whereby the head portion of the clip is maintained in contracted condition and may be caused to pass through the opening of the member by a predetermined relative movement of the supporting element toward the member, and said movable means also being operative when moved out of said predetermined position to disengage the cam element from the clip and thereby permit the said head portion to expand after passage of the head portion through the opening, and means for operating said movable means.

2. An apparatus for simultaneously installing a plurality of securing clips which, respectively, have expansible and contractible head portions in a member which has an opening of less width than the overall width of the head portions when the head portions are in their normally expanded condition and wherein the head portions are to be contracted and inserted through the opening when the head portions are in contracted condition, said apparatus comprising a supporting frame, a plurality of clip supporting elements mounted thereon in a row, each of said supporting elements being operative for supporting a clip with the head portion of the clip exposed for access to the opening in said member, a slide bar slidably mounted on said frame for movement along said row, clip engaging elements associated with the supporting elements, respectively, and each clip engaging element being mounted on said slide bar for movement therewith along said row, said clip engaging elements being operative, when moved by the slide bar in one direction, to engage the clips in the associated supporting elements simultaneously and in a manner to contract the exposed head portions, preparatory to installation of the head portions in the member, and being operative when returned in the opposite direction by the slide bar to starting position to disengage the associated clips concurrently and thereby permit the head portions to expand after passage of the head portions through the opening, and means to move said slide bar in said directions selectively.

3. An apparatus according to claim 2 characterized further in that the clip engaging elements are in the form of cams which engage and operate the clip.

4. An apparatus for the purpose described comprising a supporting frame, a plurality of clip supporting elements adjustably mounted thereon, each of said supporting elements being operative to support a securing clip with its head portion exposed in position and to be received in an opening in the member, a slide bar slidably mounted on the supporting frame, a plurality of clip engaging elements adjustably mounted on the slide bar for movement therewith and operable when the slide bar is moved in one direction to contract the exposed head portions of said clips and to hold the said head portions in contracted condition, and operable when the slide bar is moved in the opposite direction to release the clips to permit the said head portions to expand.

5. An apparatus for the purpose described comprising a supporting frame, a plurality of clip supporting elements mounted thereon, each of said supporting elements being arranged to receive a shank portion of a securing clip and support the clip with the remaining shank portion and with a head portion of the clip exposed, the head portion being in position to be received in an opening in a member, shank engaging elements, each of said shank engaging elements being lineally movable into operative engagement with the exposed portion of the shank of a clip held in said supporting elements, said shank engaging elements being constructed and arranged to operate on the shank of a clip to contract the exposed head portions thereof and to hold the said head portions in contracted condition, and being operable to disengage from the associated shank and thereby permit the head portions to expand, and means for operating said shank engaging elements concurrently.

6. An apparatus for simultaneously positioning a plurality of securing clips in a trim member, comprising a supporting frame having a slideway therein, a plurality of clip supporting stations mounted in the slideway, locking means associated with each clip supporting station to lock the said station in adjusted position along the slideway, said supporting elements each having a portion for receiving a clip and supporting the clip with the head portion of the clip exposed for allowing reception in an opening in said trim member, means under the control of the operator and movable selectively to certain positions, elements operated by said movable means, as the movable means is moved to some of said positions to engage the clips and to contract the exposed head portions of said clips and to hold said head portions in contracted condition, all preparatory to engaging the head portions with the trim member, and also operated by the movable means when the movable means is moved to other of said positions to release the clips to permit the said head portions to expand, and means for moving the movable means to said positions selectively.

7. An apparatus for installing a securing clip which has an expansible and contractible head portion and shank portion and in which the shank portion must be flexed to permit the desired installation of the head portion relative to a member to be secured, said apparatus comprising a clip supporting element having a recess for receiving the shank portion, clip operating means operable, selectively, while the shank portion is in said recess to engage and flex the shank portion and maintain the shank portion in flexed condition, and to disengage the shank portion, and opposed holding and positioning gripping jaws extending into said recess and movable toward and away from each other, and resilient means operative to urge the jaws yieldably into engagement with the shank portion to constrain the shank in position in the recess during operation of the clip operating means.

8. An apparatus for installing a cross-leg securing clip of the character described and which has an expansible and contractible head portion and shank portion and in which the shank portion must be expanded to cause the head portion to contract so as to permit the desired installation of the head portion relative to a member to be secured thereby, said apparatus comprising a clip supporting element having a recess for receiving the shank portion, clip engaging means operable, selectively, while the shank portion is in said recess, to enter and engage the inner surfaces of the shank portion and expand the shank portion and maintain the shank portion in expanded condition, and to disengage the shank portion, and opposed gripping jaws extending into said recess and movable toward and away from each other in the path of expansion and contraction of the shank, and positioned to engage outer opposite surfaces of the shank portion, means resiliently urging the jaws relatively toward each other in opposition to said clip engaging means for rendering the jaws operative to yieldably oppose the expansion of the shank and to constrain the shank in the proper position in the recess during operation of the clip engaging means, and means for operating the clip engaging means.

JOHN H. VAN UUM.